No. 791,270. Patented May 30, 1905.

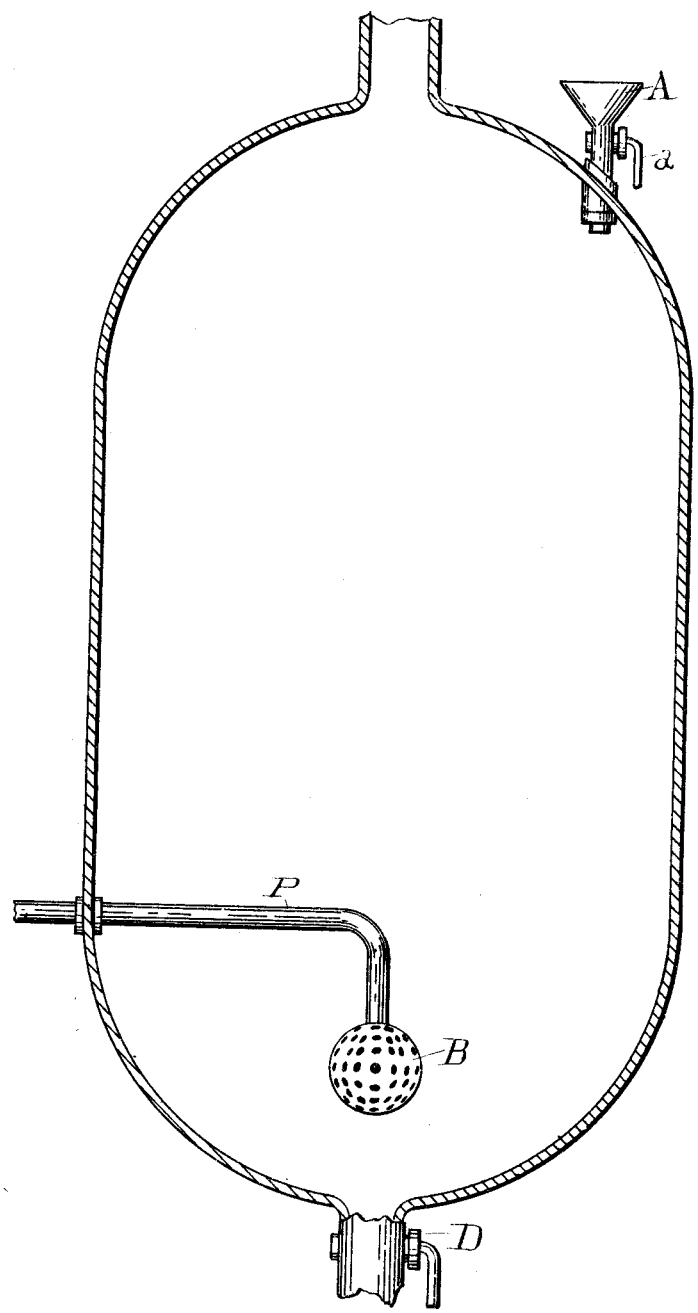

UNITED STATES PATENT OFFICE.

SAMUEL RIDGWAY KENNEDY, OF PHILADELPHIA, PENNSYLVANIA, ASSIGNOR TO THE AMERICAN DAIRY PRODUCTS AND MANUFACTURING COMPANY, OF PHILADELPHIA, PENNSYLVANIA, A CORPORATION OF PENNSYLVANIA.

PROCESS OF TREATING MILK, CREAM, &c.

SPECIFICATION forming part of Letters Patent No. 791,270, dated May 30, 1905.

Application filed April 15, 1903. Serial No. 152,792.

*To all whom it may concern:*

Be it known that I, SAMUEL RIDGWAY KENNEDY, a citizen of the United States, residing at Philadelphia, in the county of Philadelphia and State of Pennsylvania, have invented a new and useful Improvement in Processes of Treating Milk, Cream, and Admixtures Thereof, of which the following is a specification.

Milk, cream, or admixtures thereof condensed in the ordinary way have certain defects. After standing some time, especially when subjected to a low temperature, they contain a deposit or precipitation of sugar of milk and certain salts, which injures the sale and interferes with the satisfactory use of the article. This precipitation or crystallization is disseminated throughout the substance of the milk and is known as "grit" or "sand" sugar. I have never known it to entirely settle to the bottom and do not believe it is possible for it to do so; but in the bottom of the ordinary forty-quart can there is commonly a quarter or half an inch so very gritty that it has to be thrown away. The milk, &c., condensed in the ordinary way will not form a thick smooth custard like that made in my improved manner, even when cooked as hereinafter described. Ordinary condensed milk, &c., has a disagreeable cooked flavor and sickening sweetness, which I avoid. When this development of crystals of sugar and salts took place spontaneously, as above mentioned, they were very small, like fine sand, and it was thought impossible, owing to the thickness of the condensed milk and the presence of the albumen and casein, to filter them out; but I have discovered that by taking suitable precautions, as hereinafter fully described, their removal may be accomplished.

In detail my improved process is as follows: After pasteurizing, the milk, &c., is drawn into a vacuum-pan at about twenty-five to twenty-eight inches and evaporated down to between 11° and 27° Baumé. It is then run into cans or tanks and refrigerated to 32° or 33° Fahrenheit. The room should be about 32°, which would make the milk, &c., about 33°, as it is better to not quite reach the freezing-point. At this temperature a large part of the sugar of milk and salts will quickly crystallize by the sudden chill. The substance is now run into an ordinary sugar-centrifugal with perforated sides, which should be lined with some fine filtering material, such as cotton or linen cloth or similar fabric having a mesh fine enough to hold the crystals. I am at present using grass linen. On operating the centrifugal the milk, water, butter-fats, albumen, casein, and albumose, together with a small portion of sugar of milk still in solution, will pass through the filter, leaving the crystallized sugar of milk and salts on the surface. The "sling," as the material which passes through the filter is called, is now returned to the vacuum-pan and put under a vacuum of twenty-seven inches dry or twenty-five inches wet, when superheated air or live steam at one hundred pounds pressure is blown in fine jets up through the mass until the vacuum reaches three and one-half or four inches, not lower, when the mass will thicken like a custard. Either the hot air or the steam may be used; but I am at present using steam. The steam is now shut off, water turned into the condenser, and the pump started pumping off the odors of the "high cook" until the vacuum again reaches twenty-five to twenty-eight inches. On starting the pump the mass will rise yeast-like, and to prevent the entrainment and consequent loss of milk a sharp concussion of air should be given through the air-cock or butter-cup, which will break the entrainment. The condensed milk is now drawn into cooling-cans, beaten or aerated, and placed in refrigeration for not less than forty-eight hours, when it is ready for the market.

Referring now to the drawing, the figure represents a diagram of a vacuum-pan adapted to my process.

P is a pipe for introducing live steam into the vacuum-pan, and B is a perforated hollow sphere attached to the end of the pipe P. The steam blows in fine jets through the perforations in the sphere B.

A represents the air-cock or butter-cup, and *a* the handle of the same, the rapid opening and closing of which gives the necessary shock to prevent entrainment.

D represents the usual discharge.

The milk prepared by my improved process is valuable in the preparation of ice-cream, making a rich thick smooth cream much better than that prepared with ordinary condensed milk or plain cream alone. The richness and smoothness of the product is quite marked, as it is about twice as thick as ordinary condensed milk of the same degree of condensation. It can be used in the kitchen for thickening milk and cream or instead of eggs and milk in cakes and confectionery. It is of use in paper-making, in cementing glass, crockery, and other articles, as a paste for sticking labels to glass or tin, and for many other purposes in the arts.

Having as above fully described my improved process and the best method known to me of applying the same, what I claim, and desire to secure by Letters Patent, is—

The improved process of treating milk, cream and admixtures thereof, consisting of evaporating, cooling until a large part of the sugar and salts crystallize, filtering out the crystallized sugar and salts, and thickening the resulting product by heat in the manner described.

In testimony whereof I have signed my name to this specification, this 13th day of April, 1903, in the presence of two subscribing witnesses.

SAMUEL RIDGWAY KENNEDY.

Witnesses:
R. C. SNYDER,
JOHN DOLMAN.